(12) United States Patent
Tetsuka

(10) Patent No.: US 8,286,529 B2
(45) Date of Patent: Oct. 16, 2012

(54) BICYCLE CONTROL DEVICE

(75) Inventor: Toshio Tetsuka, Hyogo (JP)

(73) Assignee: Shimano Inc., Osaka (JP)

( * ) Notice: Subject to any disclaimer, the term of this patent is extended or adjusted under 35 U.S.C. 154(b) by 935 days.

(21) Appl. No.: 12/359,430

(22) Filed: Jan. 26, 2009

(65) Prior Publication Data

US 2010/0186538 A1 Jul. 29, 2010

(51) Int. Cl.
*F16C 1/10* (2006.01)

(52) U.S. Cl. ...................................... 74/502.2

(58) Field of Classification Search ............... 74/473.13, 74/473.3, 501.6, 502.2; 200/61.87, 61.88
See application file for complete search history.

(56) References Cited

U.S. PATENT DOCUMENTS

| | | | |
|---|---|---|---|
| 1,208,427 A | 12/1916 | White | |
| 4,270,402 A | 6/1981 | Nagano | |
| 5,653,649 A | 8/1997 | Watarai | |
| 5,768,945 A | 6/1998 | Ose | |
| 5,881,602 A | 3/1999 | Cirami | |
| 6,015,036 A | 1/2000 | Fukuda | |
| 6,038,923 A | 3/2000 | Lin | |
| 6,073,730 A | 6/2000 | Abe | |
| 6,216,078 B1 | 4/2001 | Jinbo et al. | |
| 6,467,786 B2 | 10/2002 | Horiuchi | |
| 6,498,474 B1 * | 12/2002 | Turner | 324/165 |
| 6,590,763 B2 | 7/2003 | Kishimoto | |
| 6,698,307 B2 | 3/2004 | Wesling et al. | |
| 6,698,567 B2 | 3/2004 | Dal Pra' | |
| 7,104,152 B2 * | 9/2006 | Levin et al. | 74/471 XY |
| 7,703,350 B2 * | 4/2010 | Fujii | 74/501.6 |
| 2001/0053724 A1 | 12/2001 | Campagnolo | |
| 2004/0200307 A1 | 10/2004 | Mitchell | |
| 2008/0087131 A1 | 4/2008 | Tetsuka | |
| 2009/0031841 A1 | 2/2009 | Tetsuka | |
| 2010/0294068 A1 * | 11/2010 | Fujii et al. | 74/473.13 |

FOREIGN PATENT DOCUMENTS

| | | |
|---|---|---|
| EP | 0 601 211 A1 | 6/1994 |
| EP | 1 375 325 A2 | 1/2004 |
| EP | 1 813 525 A2 | 8/2007 |
| EP | 1 955 942 A2 | 8/2008 |
| GB | 2 099 961 A | 12/1982 |

* cited by examiner

*Primary Examiner* — Vicky Johnson

(74) *Attorney, Agent, or Firm* — Global IP Counselors, LLP

(57) ABSTRACT

A bicycle control device is provided with a base member, a first operating member, a first non-contact switch and a first clicking mechanism. The first operating member is movably mounted with respect to the base member to move between a rest position, a first operation position and a second operation position. The first non-contact switch detects movement of the first operating member with respect to the base member from the rest position to the first operation position. The first non-contact switch is further detects movement of the first operating member with respect to the base member from the rest position to the second operation position. The first clicking mechanism is arranged such that the first clicking mechanism produces a first haptic feedback response to indicate the first operating member being moved from the rest position to the first operation position.

15 Claims, 13 Drawing Sheets

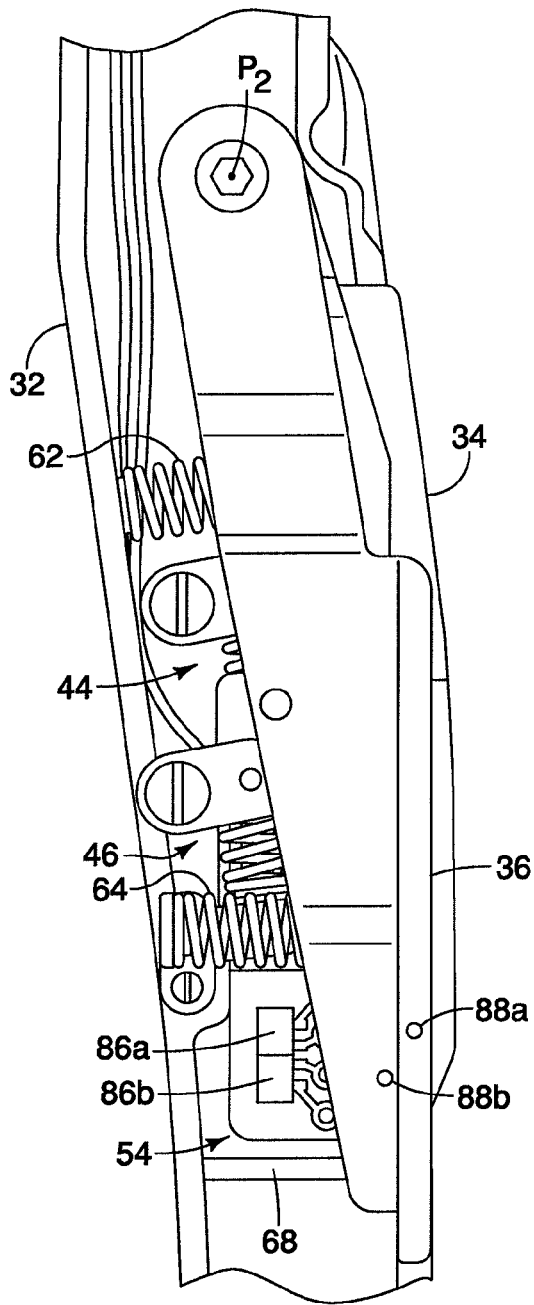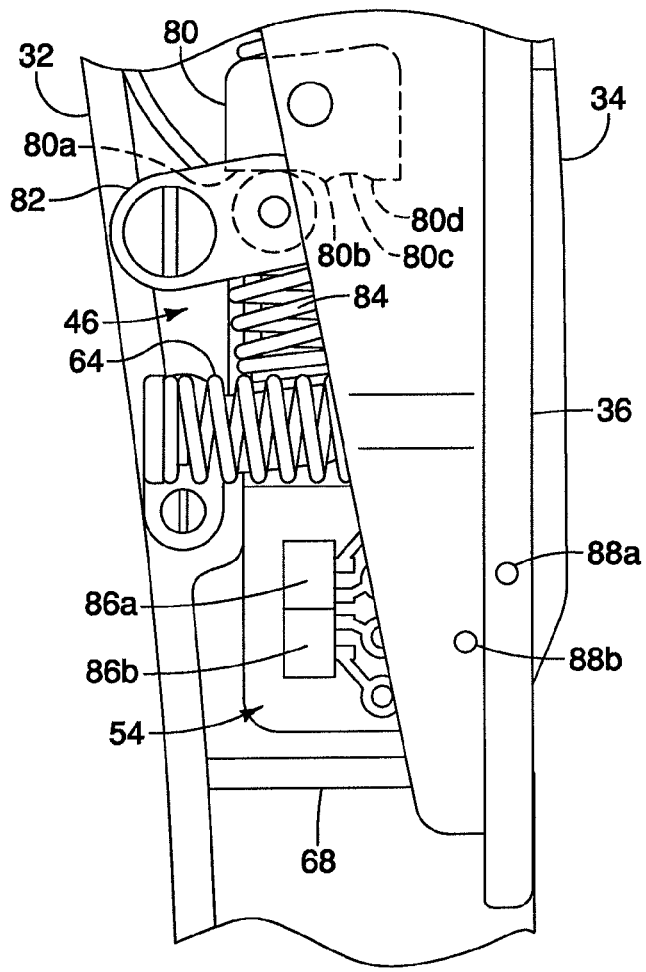
FIG. 17
FIG. 18

BICYCLE CONTROL DEVICE

BACKGROUND OF THE INVENTION

1. Field of the Invention

This invention generally relates to a bicycle control device. More specifically, the present invention relates to a bicycle control device with at least one operating member for controlling an electrical device in which the amount of movement (stroke) of the operating member determines the operation that is to be performed.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

In the past, bicycle shifters were mechanically operated devices that were sometimes located near the brake levers of the bicycle. Thus, an operating force was typically applied by one of the rider's fingers to operate a shift control lever, which in turn transmitted the operating force to the drive component of a bicycle shifting mechanism by a cable that was fixed at one end to the control lever. More recently, electrical switches have been used instead of mechanical control levers in order to operate the bicycle shifting mechanism. Three examples of electrical shift control devices are disclosed in U.S. Pat. No. 6,073,730, U.S. Pat. No. 6,129,580 and U.S. Pat. No. 6,216,078 (all assigned to Shimano, Inc.). These patents disclose one or more electrical switches that are coupled to the bracket body. Another example of this type of electrical shift control device is disclosed in U.S. Patent Application Publication No. 2005/0223840 (assigned to Shimano, Inc.). In this publication, an electrical switch is mounted to the brake lever.

SUMMARY OF THE INVENTION

One object of the present invention is to provide a bicycle control device having an operating member that moves in a single actuating direction to selectively operate a non-contact switch to perform a first operation when moved along a first stroke and to perform a second operation when moved along a second stroke that is longer than the first stroke.

The foregoing objects can basically be attained by providing a bicycle control device that basically comprises a base member, a first operating member, a first non-contact switch and a first clicking mechanism. The first operating member is movably mounted with respect to the base member to move between a rest position, a first operation position and a second operation position that is past the first operation position during a single progressive stroke of the first operating member from the rest position to the second operation position. The first non-contact switch is operatively arranged with respect to the first operating member to detect movement of the first operating member with respect to the base member from the rest position to the first operation position. The first non-contact switch is further arranged with respect to the first operating member to detect movement of the first operating member with respect to the base member from the rest position to the second operation position. The first clicking mechanism is operatively arranged with respect to the first operating member such that the first clicking mechanism produces a first haptic feedback response to indicate the first operating member being moved from the rest position to the first operation position.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 17 is an enlarged, partial rear elevational view of the brake lever with the second shift operating lever in the rest position;

FIG. 18 is an enlarged, partial rear elevational view of the area of the brake lever with the second shift operating lever in the rest position with respect to the second clicking mechanism;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
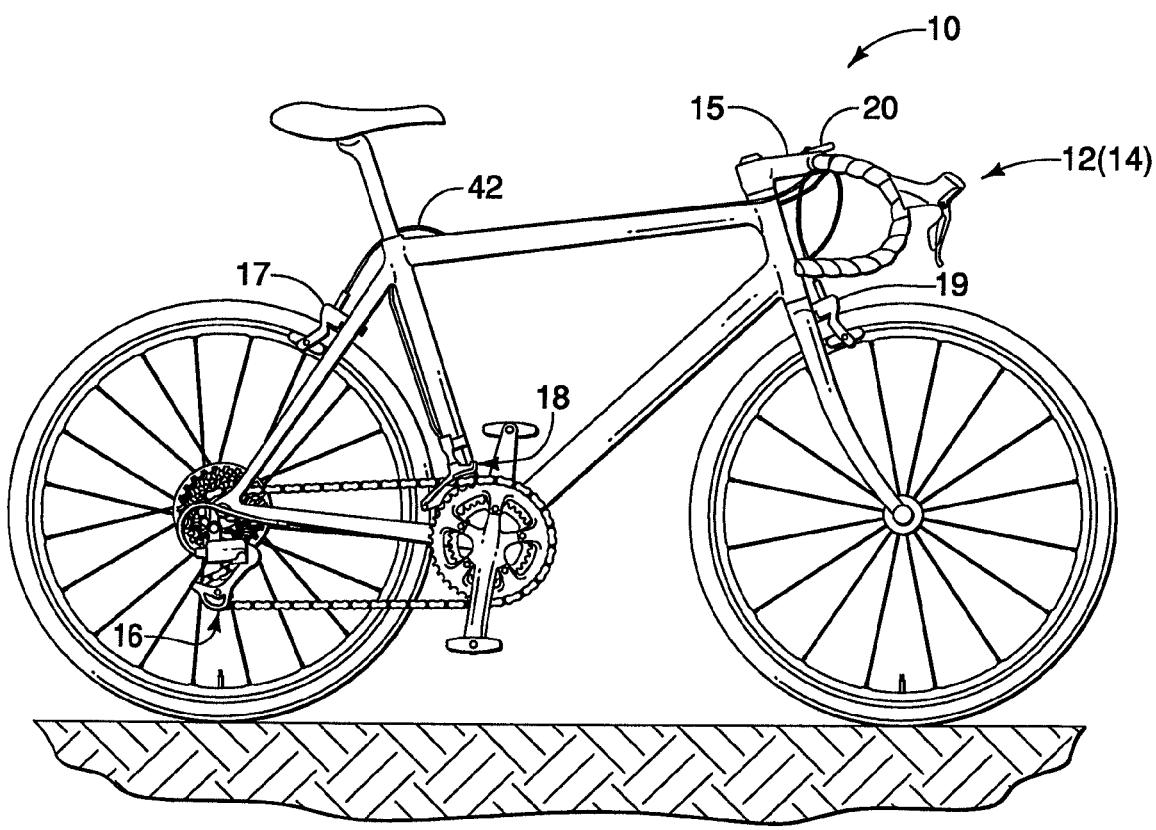
FIG. 1 is a side elevational view of a bicycle equipped with a pair of bicycle control (brake/shift) devices (only one shown) coupled to a drop type handlebar in accordance with a first embodiment.
Figure 2:
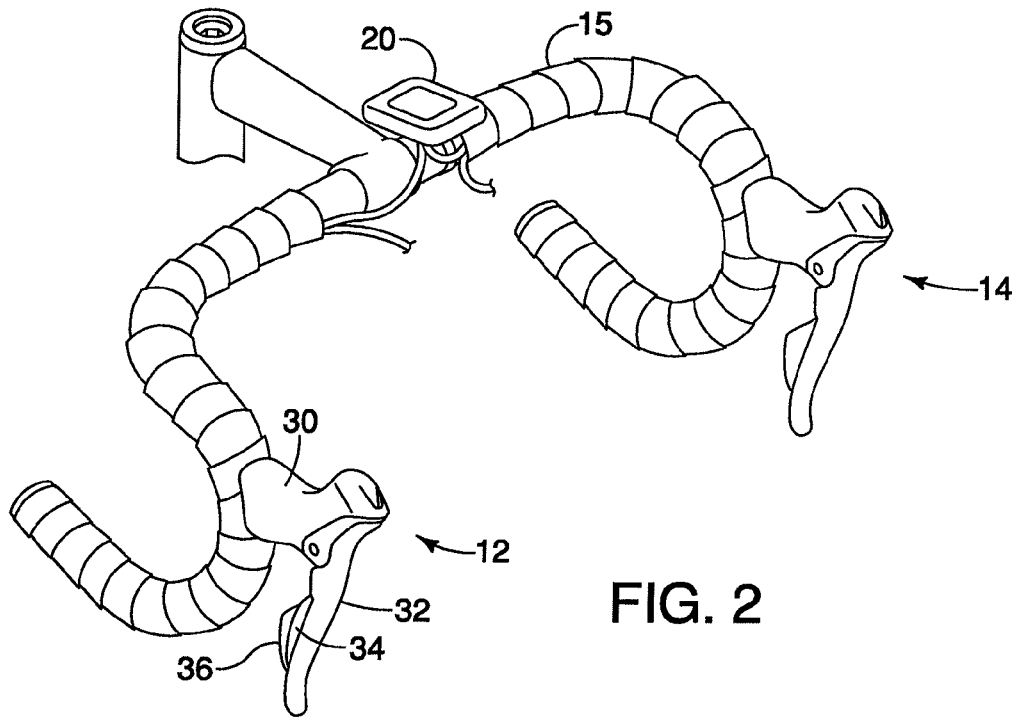
FIG. 2 is a top perspective view of the handlebar portion of the bicycle showing a pair of road bicycle control (brake/shift) devices coupled the a drop type handlebar.

Referring initially to FIGS. 1 and 2, a bicycle 10 is illustrated with a pair of control devices 12 and 14 (only one shown in FIG. 1) mounted in a drop type bicycle handlebar 15 in accordance with one embodiment. The control device 12 is operatively coupled to a rear electronic derailleur 16 and a rear braking device 17, while the control device 14 is operatively coupled to a front electronic derailleur 18 and a front braking device 19. The right and left hand side control devices 12 and 14 are identical in construction and operation, except that they are mirror images. Thus, only the control device 12 will be discussed and illustrated herein.

Preferably, a cycle computer 20 is operatively coupled between the control devices 12 and 14 and the rear and front electronic derailleurs 14 and 16. Alternatively, the cycle computer 20 can be eliminated such that the control devices 12 are directly electrically coupled to the rear and front electronic derailleurs 14 and 16. In such a case, each of the control devices 12 includes its own built in cycle computer. Also, the bicycle 10 is preferably provided with a generator such as a hub dynamo, and a battery which can be located in a portion of a frame tube such as the seat tube of the bicycle 10. The generator and the battery are electrically coupled to the control devices 12 and 14 and the rear and front electronic derailleurs 14 and 16 in a conventional manner.

Figure 3:
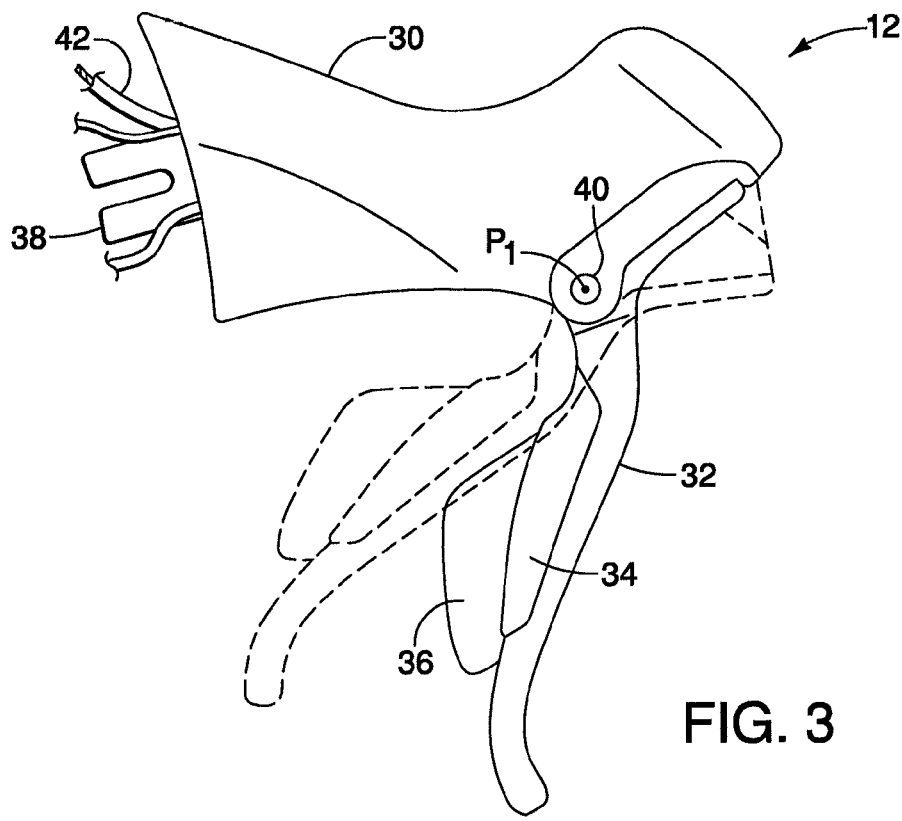
FIG. 3 is an outside elevational view of one of the bicycle control (brake/shift) devices illustrated in FIGS. 1 and 2.
Figure 4:
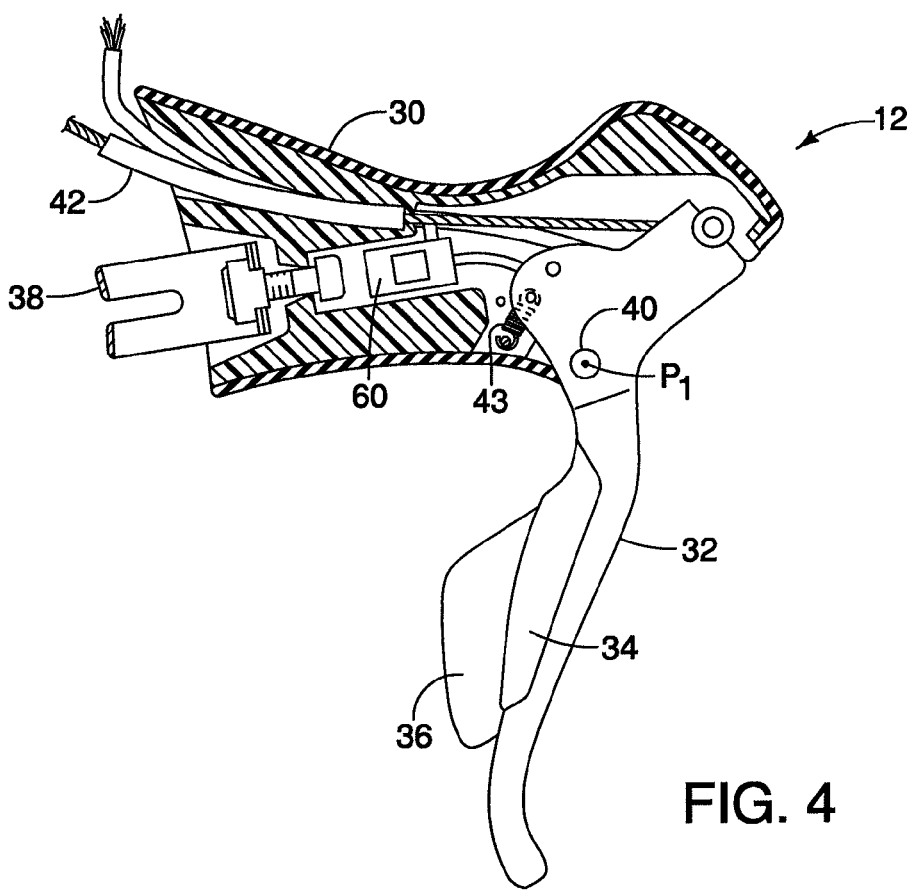
FIG. 4 is a center cross-sectional view of the bicycle control device illustrated in illustrated in FIGS. 2 to 3.
Figure 5:
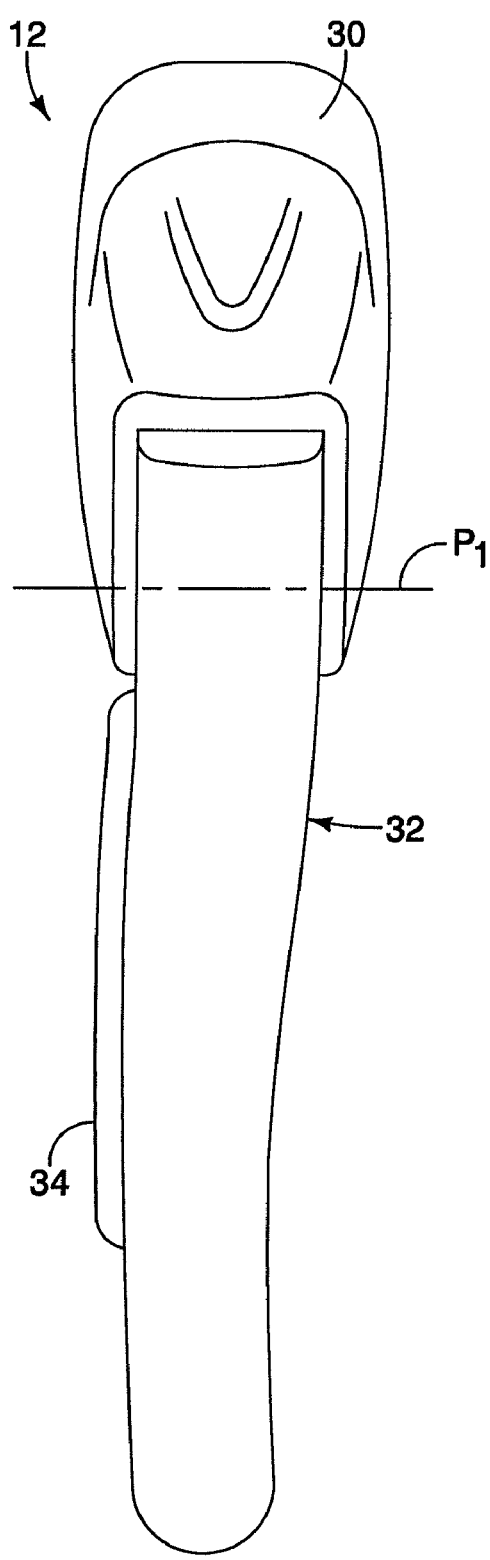
FIG. 5 is a front elevational view of the bicycle control (brake/shift) device illustrated in FIGS. 2 to 4.
Figure 6:
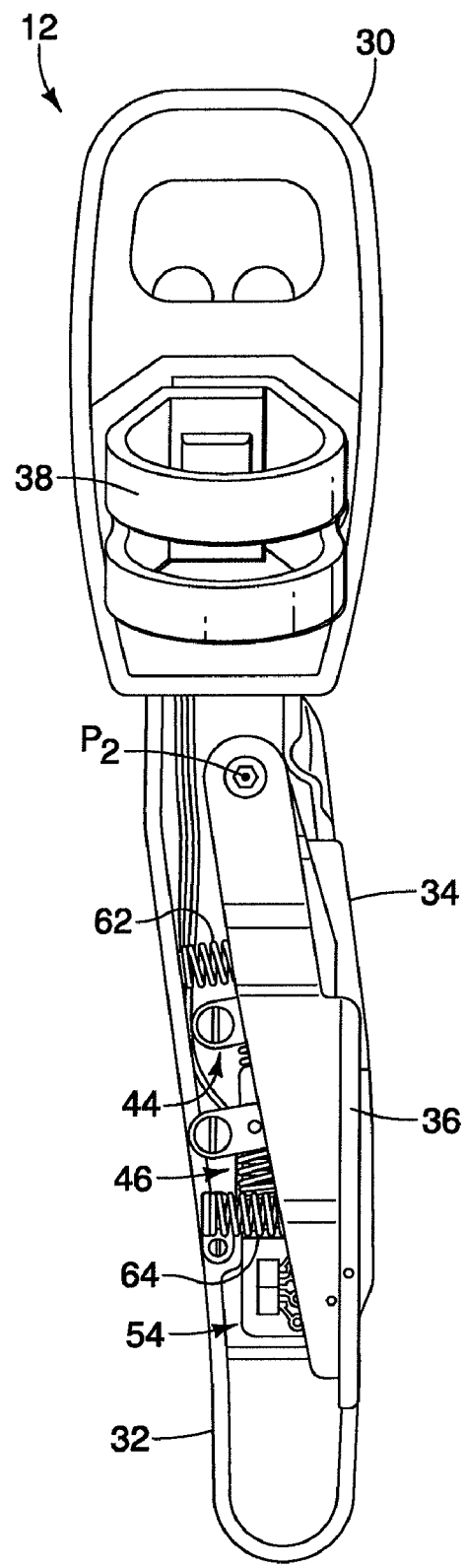
FIG. 6 is a rear elevational view of the bicycle control (brake/shift) device illustrated in FIGS. 2 to 5.

As best seen in FIGS. 3 and 4, the bicycle control device 12 basically comprises a lever bracket or base member 30, a brake lever 32 pivotally coupled to the base member 30 about a brake lever pivot axis $P_1$ and a pair of shift (first and second) operating members 34 and 36 pivotally coupled to the brake lever 32 about a pivot axis $P_2$. The brake lever 32 is shown in full lines to illustrate the rest position, and shown in dashed lines to illustrate the braking position. The base member 30 and the brake lever 32 are configured as a drop down handlebar, road bicycle shifter.

As seen in FIGS. 2 and 3, the base member 30 is configured as a rider hand grip part or drop handlebar bracket body. The base member 30 is mounted to the drop type handlebar 15 by a conventional tube clamp 38 that is attached to the rear end of the base member 30. The tube clamp 38 constitutes a handlebar mounting structure for mounting to the drop type handlebar 15. The second end of the base member 30 pivotally supports the brake lever 32 by a pivot pin 40. Preferably, the brake lever 32 is a cable operated brake lever that is pivotally mounted to the base member 30 for performing a bicycle braking operation. In other words, the brake lever 32 is attached to a brake cable 42 to operate the braking device 17. A return spring 43 is operatively coupled between the brake lever 32 and the base member 30 to bias the brake lever 32 to the rest position. The return spring 43 is preferably a coil tension spring that is elongated when the brake lever 32 is moved from the rest position to the braking position.

Figure 7:
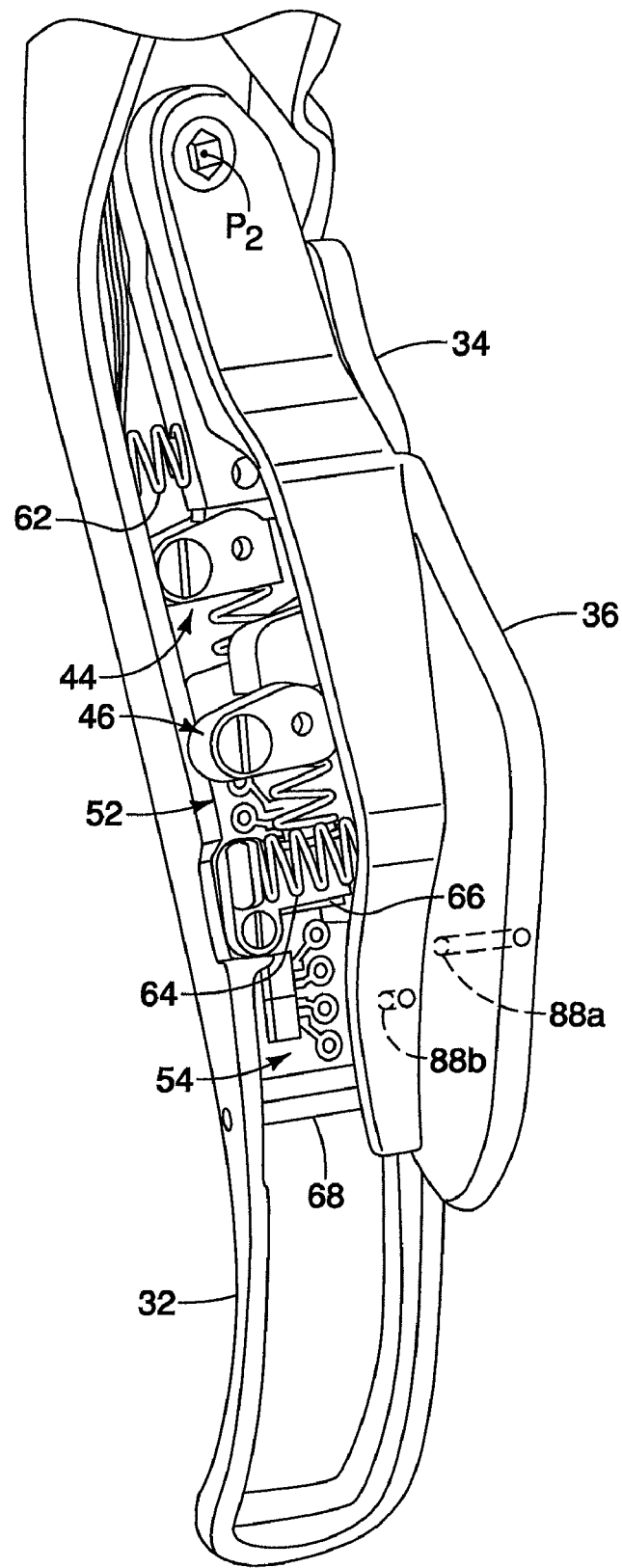
FIG. 7 is an enlarged, partial rear perspective view of the brake lever and the shift operating levers with the non-contact switches mounted to the brake lever.
Figure 9:
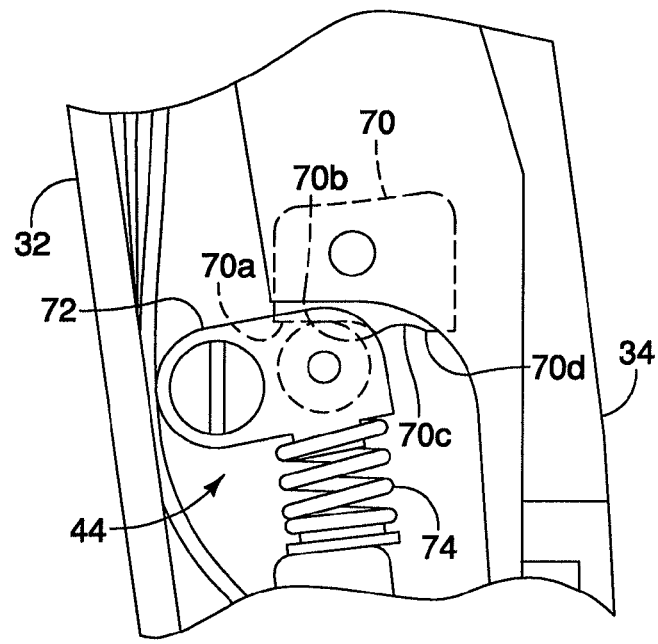
FIG. 9 is an enlarged, partial rear elevational view of the area of the brake lever with the first shift operating lever in the rest position with respect to the first clicking mechanism.
Figure 8:
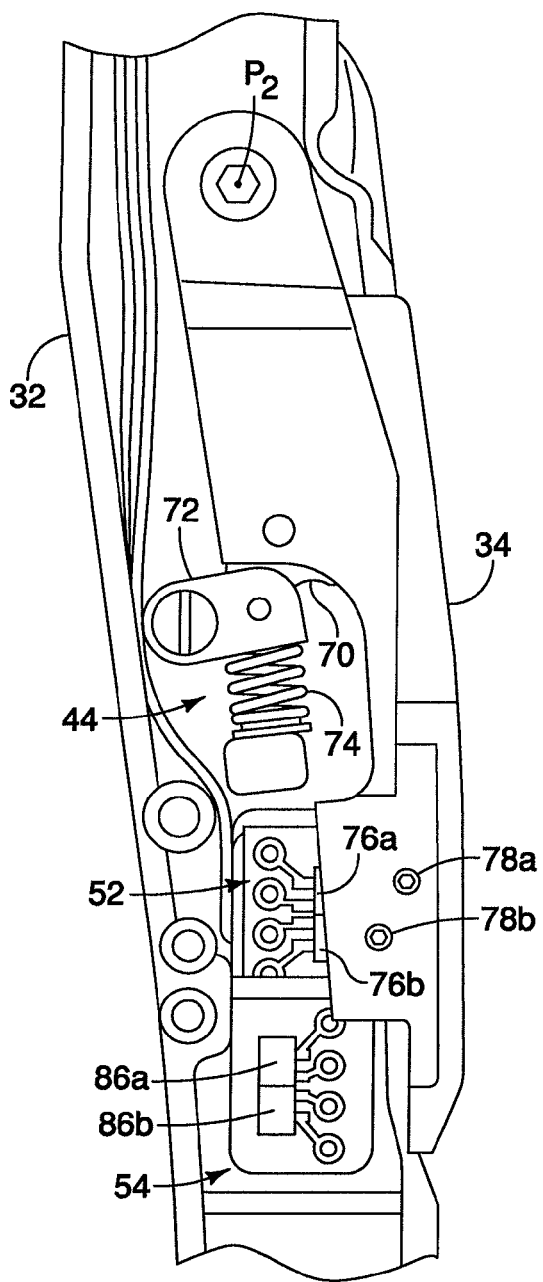
FIG. 8 is an enlarged, partial rear elevational view of the brake lever with the first shift operating lever in the rest position.
Figure 11:
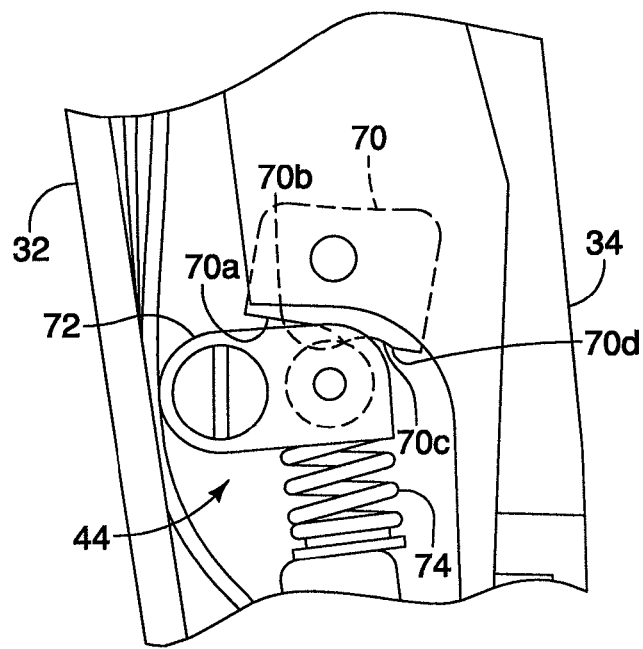
FIG. 11 is an enlarged, partial rear elevational view of the area of the brake lever with the first shift operating lever in the first operation position with respect to the first clicking mechanism.
Figure 10:
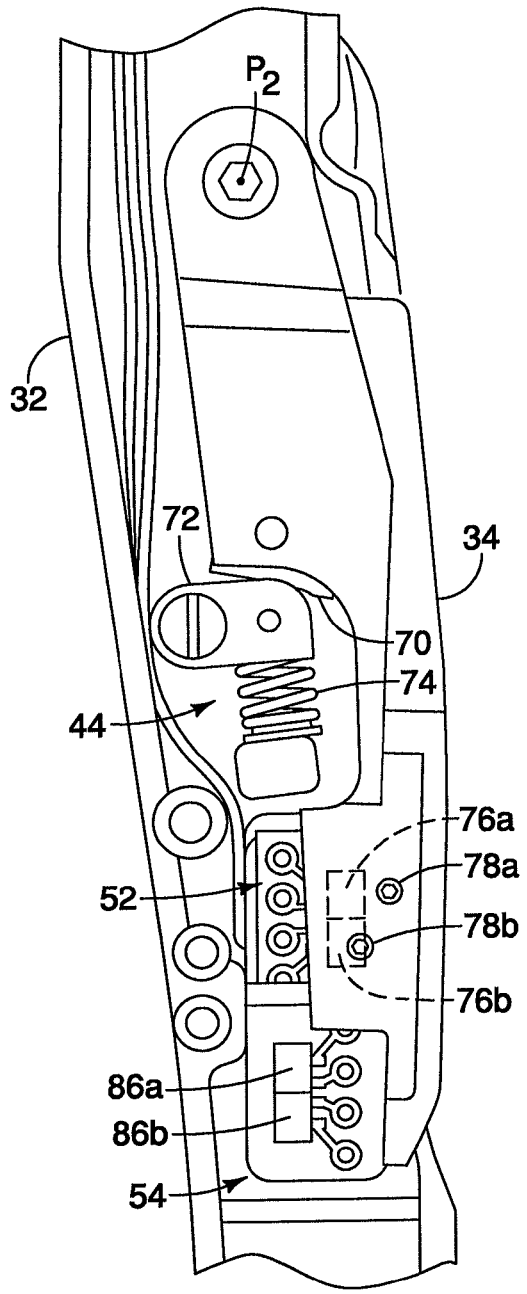
FIG. 10 is an enlarged, partial rear elevational view of the brake lever with the first shift operating lever in the first operation position.
Figure 13:
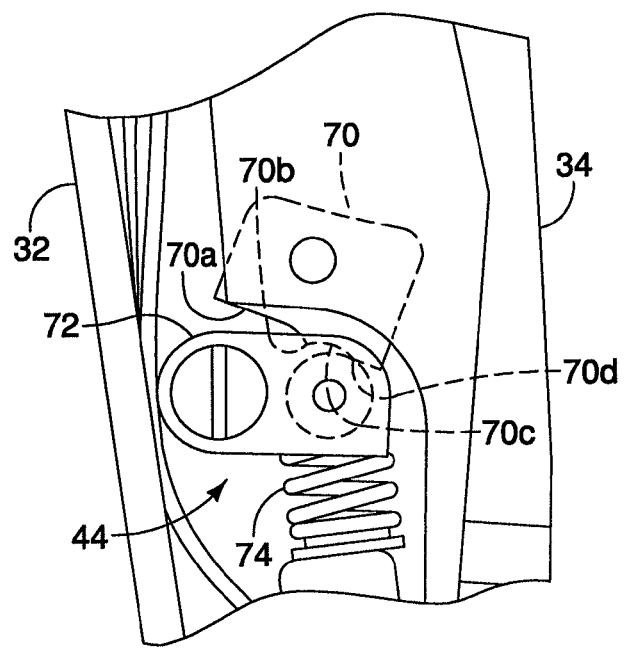
FIG. 13 is an enlarged, partial rear elevational view of the area of the brake lever with the first shift operating lever in the second operation position with respect to the first clicking mechanism.
Figure 12:
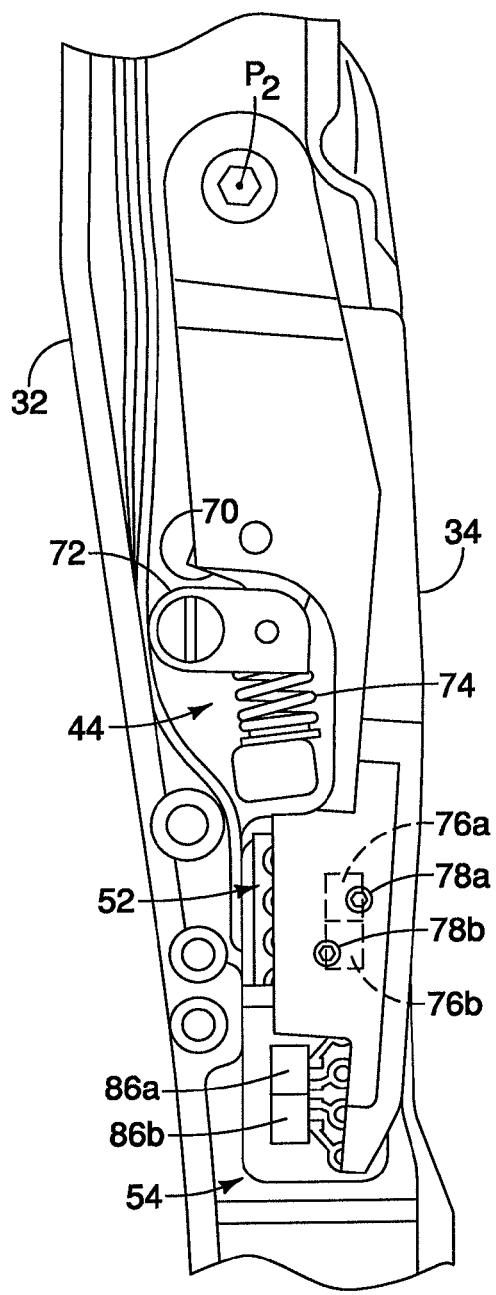
FIG. 12 is an enlarged, partial rear elevational view of the brake lever with the first shift operating lever in the second operation position.

As seen in FIG. 7, in this embodiment, the first and second operating members 34 and 36 are levers that are pivotally attached to the back side of the brake lever 32. Each of the first and second operating members 34 and 36 can shift transmission by one or two steps (shift positions) depending on its stroke length (i.e., the amount of angular movement). The first and second operating members 34 and 36 are provided with first and second clicking mechanisms 44 and 46, respectively, for haptically notifying the rider of the boundary between a one-step shift operation position and a two-step shift operation position for preventing unintentional two-step shift. Further, first and second non-contact switches 52 and 54 are provided on the back side of the brake lever 32 and the first and second operating members 34 and 36 at locations to be actuated by pivotal movement of the first and second operating members 34 and 36, respectively.

In the illustrated embodiment, the base member 30 has an electrical control unit 60 that is electrically coupled to the first and second non-contact switches 52 and 54, and that is selectively wired to the cycle computer 20 and the rear electronic derailleur 16. The control unit 60 receives operation signals from the first and second non-contact switches 52 and 54 that are indicative of the first and second operating members 34 and 36 being moved to the first and second operating positions. The control unit 60 is a microcomputer that is located in the base member 30. However, the control unit 60 can be remotely located if needed and/or desired.

In the illustrated embodiment, the first operating member 34 stops at the rest position by contacting the side wall of the brake lever 32 due to a spring force from a first return spring 62. The second operating member 36 stops at the rest position by contacting the first operating member 34 due to another spring force from a second return spring 64. The first operating member 34 is designed to be selectively moved to perform a first shift operation by a first amount of angular movement (i.e., a first stroke) and to perform a second shift operation by a second amount of angular movement (i.e., a second stroke)

during a single progressive stroke of the first operating member 34 from the rest position to the second operation position. Similarly, the second operating member 36 is designed to be selectively moved to perform a first shift operation by a first amount of angular movement (i.e., a first stroke) and to perform a second shift operation by a second amount of angular movement (i.e., a second stroke) during a single progressive stroke of the second operating member 36 from the rest position to the second operation position. When the first and second operating members 34 and 36 are pivoted, the brake lever 32 is normally stationary. Thus, generally speaking, the first and second operating members 34 and 36 are each movably mounted with respect to the base member 30 to move between the rest position, the first operation position and the second operation position with the second operation position being past the first operation position during a single progressive stroke. Preferably, the free end (i.e., the distal end with respect to the pivot axis $P_2$) of the first operating member 34 is supported by a guide pin 66 that is received in a slot of the free end of the first operating member 34. Likewise, the free end (i.e., the distal end with respect to the pivot axis $P_2$) of the second operating member 36 is supported by a guide pin 68 that is received in a slot of the free end of the second operating member 36.

As seen in FIGS. 8 to 13, when the first operating member 34 is moved, the first and second operating members 34 and 36 move together with respect to the base member 30 and the brake lever 32. Thus, as the first operating member 34 is moved to the first operation position, a first click (first haptic feedback response or first notification) for the first operating member 34 occurs first from the first clicking mechanism 44. Then, as the first operating member 34 is moved further to the second operation position of the first operating member 34, a second click (second haptic feedback response or second notification) for the first operating member 34 occurs next.

As seen in FIGS. 17 to 22, when the second operating member 36 is moved, the first operating member 34 remains stationary. In other words, when the second operating member 36 is operated, only the second operating member 36 pivots with respect to the base member 30 and the brake lever 32. Thus, as the second operating member 36 is moved to the first operation position, a first click (first haptic feedback response or first notification) for the second operating member 36 occurs first from the second clicking mechanism 46. Preferably as shown, the first click (first haptic feedback response or first notification) for the second operating member 36 occurs after the second click (second haptic feedback response or second notification) for the first operating member 34. Thus, the first click (first haptic feedback response or first notification) for the second operating member 36 preferably does not occur when the first operating member 34 is pivoted from the rest position to the second operation position for the first operating member 34. In other word, the first and second clicking mechanisms 44 and 46 are operatively arranged with respect to each other such that the first haptic feedback response of the first operating member 34 occurs prior to the first haptic feedback response of the second operating member 36 when the first and second operating members 24 and 36 are moved together during operating movement of the first operating member 34 from the rest position of the first operating member 34 to the first operation position of the first operating member 34. However, the first click (first haptic notification) for the second operating member 36 can occur at the same rotational position or angular movement (i.e., the same amount of stroke length) as the second click (second haptic notification) for the first operating member 34. In this case, the control unit 60 must cancel the shift command from the second operating member 36, when the first operating member 34 is pivoted from the rest position to the second operation position for the first operating member 34.

As seen in FIGS. 8 to 13, the first clicking mechanism 44 basically includes a cam member 70, a contact member 72 and a biasing member 74. The cam member 70 is fixed to the first operating member 34, while the contact member 72 is pivotally attached to the rear side of the brake lever 32. The biasing member 74 is mounted between the rear side of the brake lever 32 and the contact member 72 for urging the contact member 72 against the cam member 70. The cam member 70 includes a first cam surface 70a, a first transition surface 70b, a second cam surface 70c and a second transition surface 70d. The first transition surface 70b is disposed between the first and second cam surfaces 70a and 70c, and produces the first haptic feedback response to indicate the first operating member 34 being moved from the rest position to the first operation position. The second transition surface 70d is disposed after the second cam surface 70c, and produces the second haptic feedback response to indicate the first operating member 34 being moved from the rest position past the first operation position to the second operation position.

The first and second haptic feedback responses of the first operating member 34 are produced by the contact member 72 being moved against urging force of the biasing member 74 due to the shapes of the surfaces 70a to 70d. In particular, the first and second transition surfaces 70b and 70d are shaped such that the force required to pivot the first operating member 34 sharply increases and sharply decreases as the contact member 72 rides over the first and second transition surfaces 70b and 70d of the cam member 70. Preferably, this movement of the contact member 72 also produces a noise to provide audible notifications of the first and second operation positions of the first operating member 34 being attained.

Figure 14:
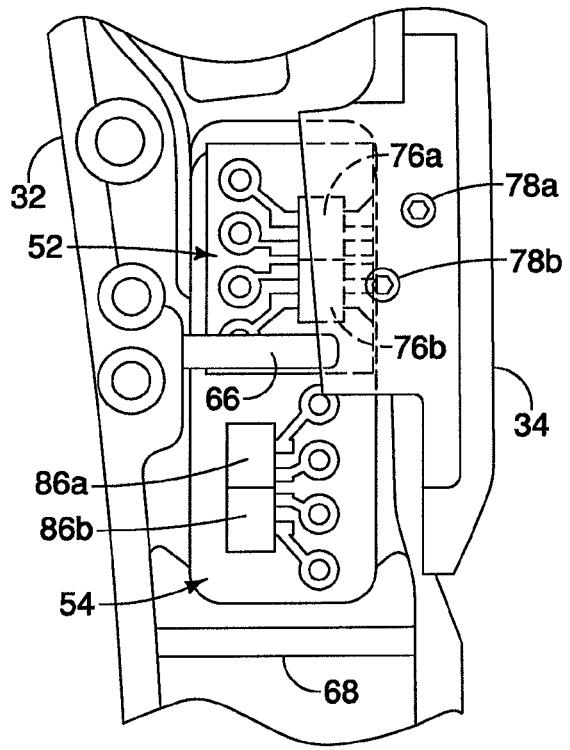
FIG. 14 is an enlarged, partial rear elevational view of the area of the brake lever with the first shift operating lever in the rest position with respect to the first non-contact switch.
Figure 15:
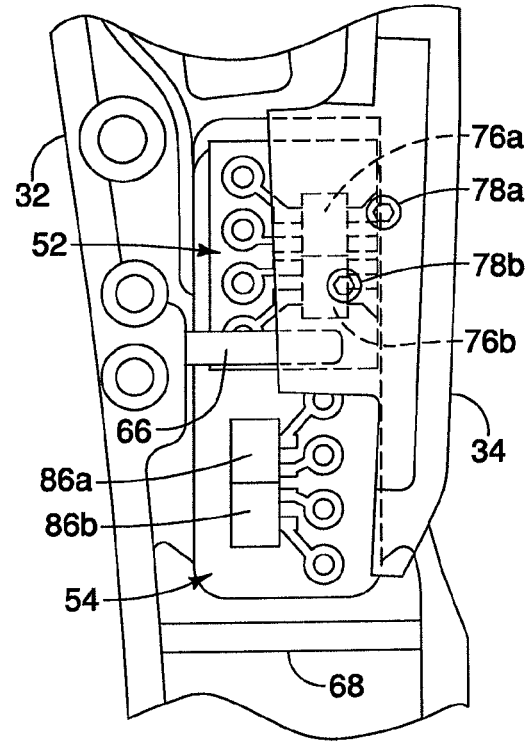
FIG. 15 is an enlarged, partial rear elevational view of the area of the brake lever with the first shift operating lever in the first operation position with respect to the first non-contact switch.
Figure 16:
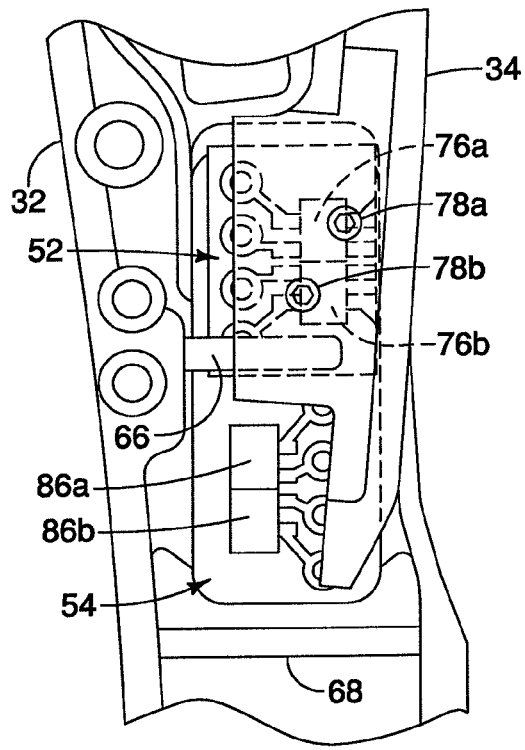
FIG. 16 is an enlarged, partial rear elevational view of the area of the brake lever with the first shift operating lever in the second operation position with respect to the first non-contact switch.
Figure 20:
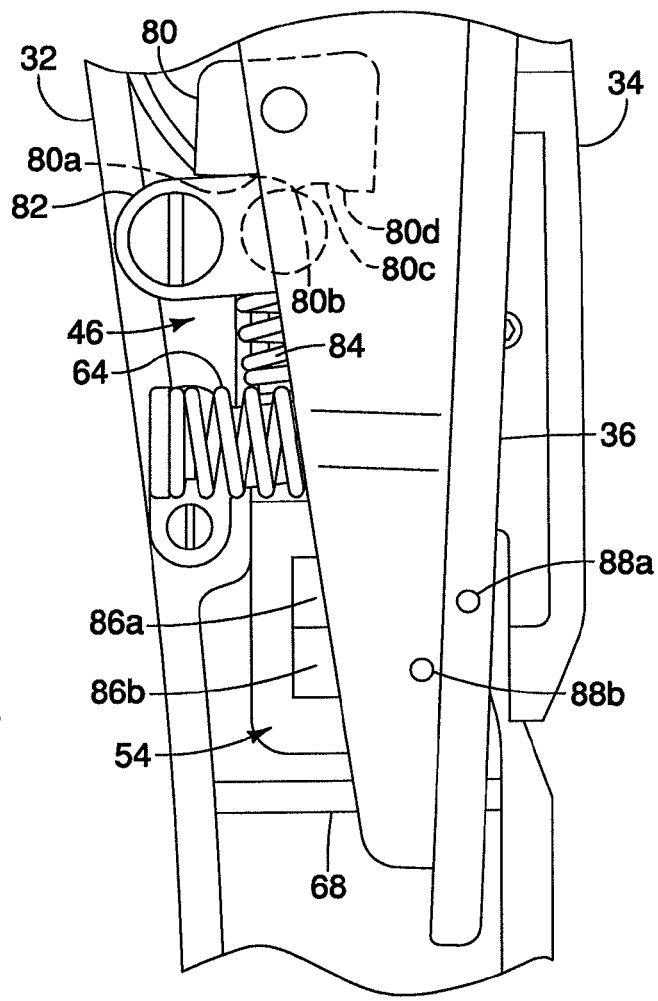
FIG. 20 is an enlarged, partial rear elevational view of the area of the brake lever with the second shift operating lever in the first operation position with respect to the second clicking mechanism.
Figure 19:
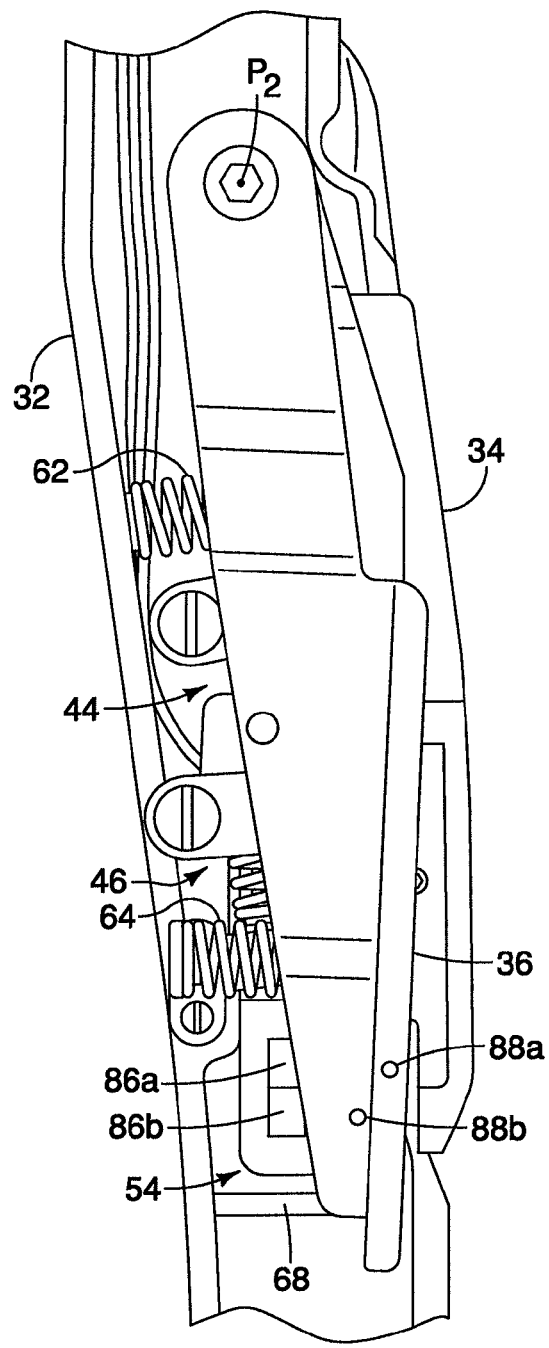
FIG. 19 is an enlarged, partial rear elevational view of the brake lever with the second shift operating lever in the first operation position.
Figure 21:
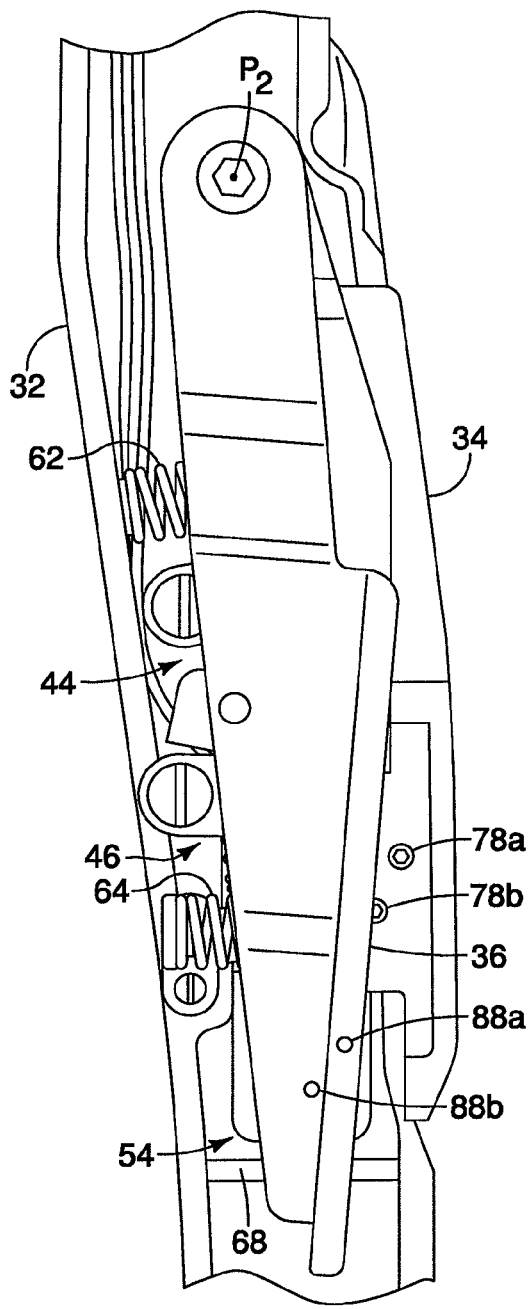
FIG. 21 is an enlarged, partial rear elevational view of the brake lever with the second shift operating lever in the second operation position.
Figure 22:
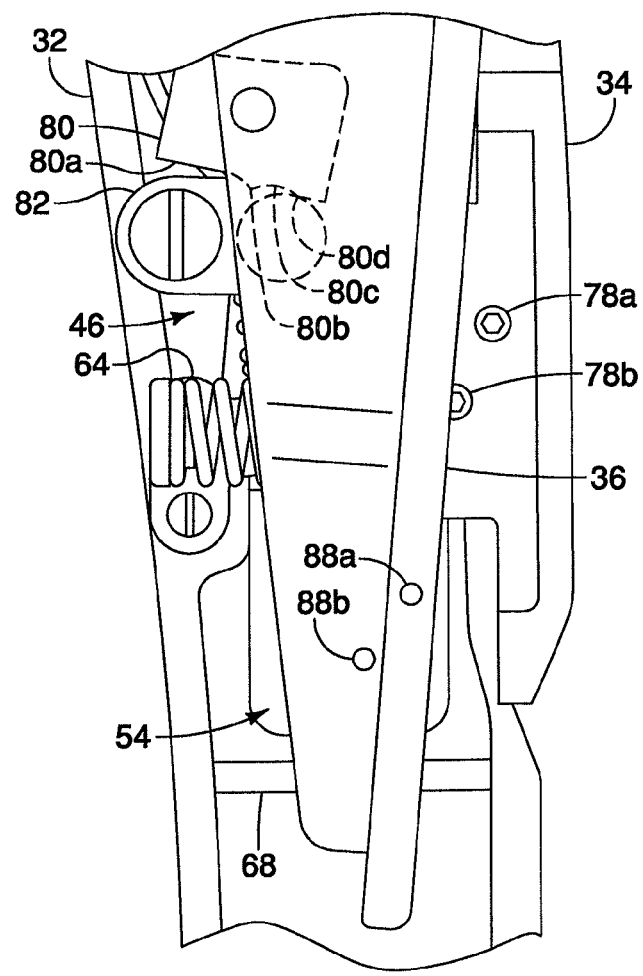
FIG. 22 is an enlarged, partial rear elevational view of the area of the brake lever with the second shift operating lever in the second operation position with respect to the second clicking mechanism.

As seen in FIGS. 14 to 16, the first non-contact switch 52 is a non-contact type comprising a pair of magnetic sensors 76a and 76b and a pair of magnets 78a and 78b that form a magnet sensing unit, but of course is not limited to a magnet sensing unit. Optical sensor etc. can be used. The magnetic sensors 76a and 76b are disposed on a printed circuit board that is attached to the rear side of the brake lever 32. The magnetic sensors 76a and 76b are disposed at different radial distance with respect to the pivot axis $P_2$. The magnets 78a and 78b are attached to the first operating member 34 at different radial distance with respect to the pivot axis $P_2$ and at different angular orientations with respect to the pivot axis $P_2$.

The magnetic sensor 76b and the magnet 78b of the first non-contact switch 52 are operatively arranged with respect to the first operating member 34 to detect movement of the first operating member 34 with respect to the base member 30 from the rest position to the first operation position. The magnetic sensor 76a and the magnet 78a of the first non-contact switch 52 are operatively arranged with respect to the first operating member 34 to detect movement of the first operating member 34 with respect to the base member 30 from the rest position to the second operation position.

As seen in FIGS. 17 to 22, the second clicking mechanism 46 basically includes a cam member 80, a contact member 82 and a biasing member 84. The cam member 80 is fixed to the second operating member 36, while the contact member 82 is pivotally attached to the rear side of the brake lever 32. The biasing member 84 is mounted between the rear side of the brake lever 32 and the contact member 82 for urging the contact member 82 against the cam member 80. The cam member 80 includes a first cam surface 80a, a first transition surface 80b, a second cam surface 80c and a second transition surface 80d. The first transition surface 80b is disposed between the first and second cam surfaces 80a and 80c, and produces the first haptic feedback response to indicate the second operating member 36 being moved from the rest position to the first operation position. The second transition surface 80d is disposed after the second cam surface 80c, and produces the second haptic feedback response to indicate the second operating member 36 being moved from the rest position past the first operation position to the second operation position.

The first and second haptic feedback responses of the second operating member 36 are produced by the contact member 82 being moved against urging force of the biasing member 84 due to the shapes of the surfaces 80a to 80d. In particular, the first and second transition surfaces 80b and 80d are shaped such that the force required to pivot the second operating member 36 sharply increases and sharply decreases as the contact member 82 rides over the first and second transition surfaces 80b and 80d of the cam member 80. Preferably, this movement of the contact member 82 also produces a noise to provide audible notifications of the first and second operation positions of the second operating member 36 being attained.

Figure 23:
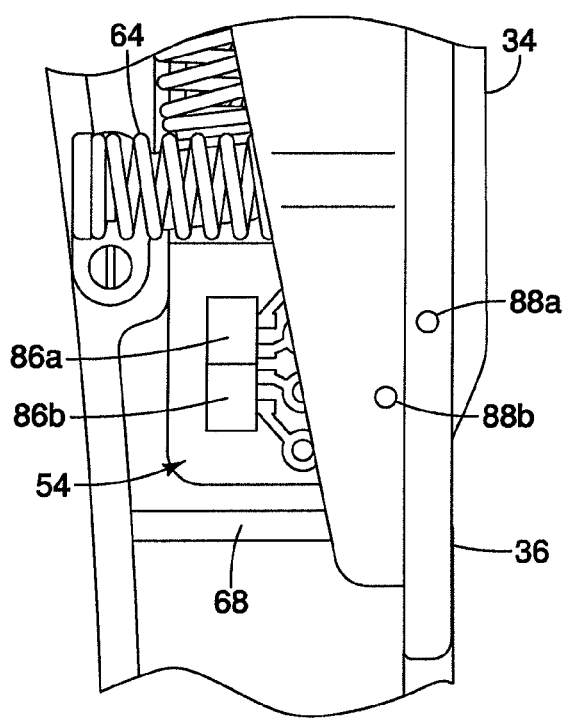
FIG. 23 is an enlarged, partial rear elevational view of the area of the brake lever with the first shift operating lever in the rest position with respect to the first non-contact switch.
Figure 24:
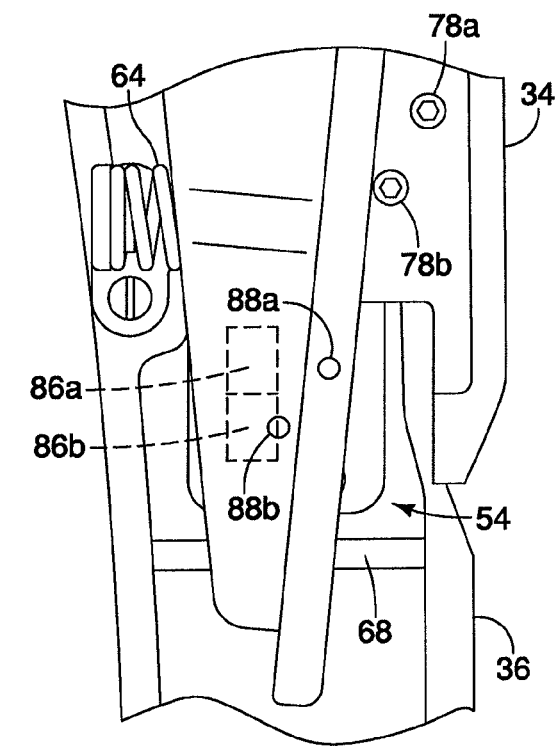
FIG. 24 is an enlarged, partial rear elevational view of the area of the brake lever with the second shift operating lever in the first operation position with respect to the second non-contact switch.
Figure 25:
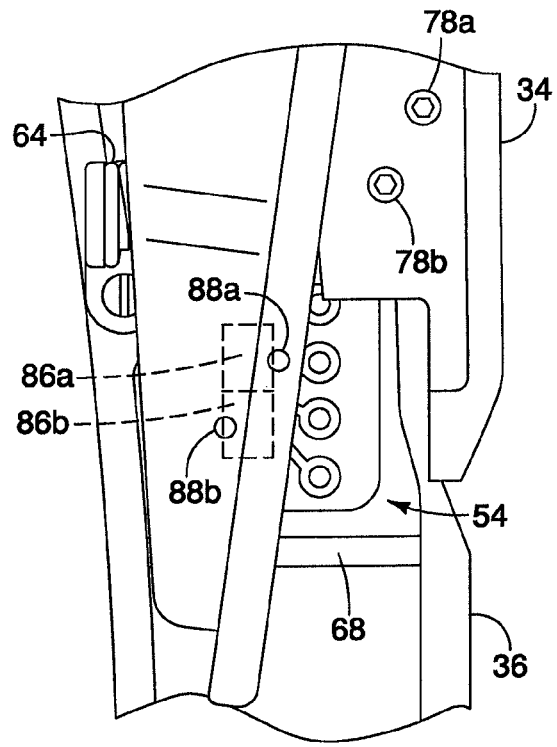
FIG. 25 is an enlarged, partial rear elevational view of the area of the brake lever with the second shift operating lever in the second operation position with respect to the second non-contact switch.

As seen in FIGS. 23 to 25, the second non-contact switch 54 is a non-contact type comprising a pair of magnetic sensors 86a and 86b and a pair of magnets 88a and 88b that form a magnet sensing unit, but of course is not limited to a magnet sensing unit. Optical sensor etc. can be used. The magnetic sensors 86a and 86b are disposed on a printed circuit board that is attached to the rear side of the brake lever 32. The magnetic sensors 86a and 86b are disposed at different radial distance with respect to the pivot axis $P_2$. The magnets 88a and 88b are attached to the second operating member 36 at different radial distance with respect to the pivot axis $P_2$ and at different angular orientations with respect to the pivot axis $P_2$.

The magnetic sensor 86b and the magnet 88b of the second non-contact switch 54 are operatively arranged with respect to the second operating member 36 to detect movement of the second operating member 36 with respect to the base member 30 from the rest position to the first operation position. The magnetic sensor 86a and the magnet 88a of the second non-contact switch 54 are operatively arranged with respect to the second operating member 36 to detect movement of the second operating member 36 with respect to the base member 30 from the rest position to the second operation position.

Figure 26:
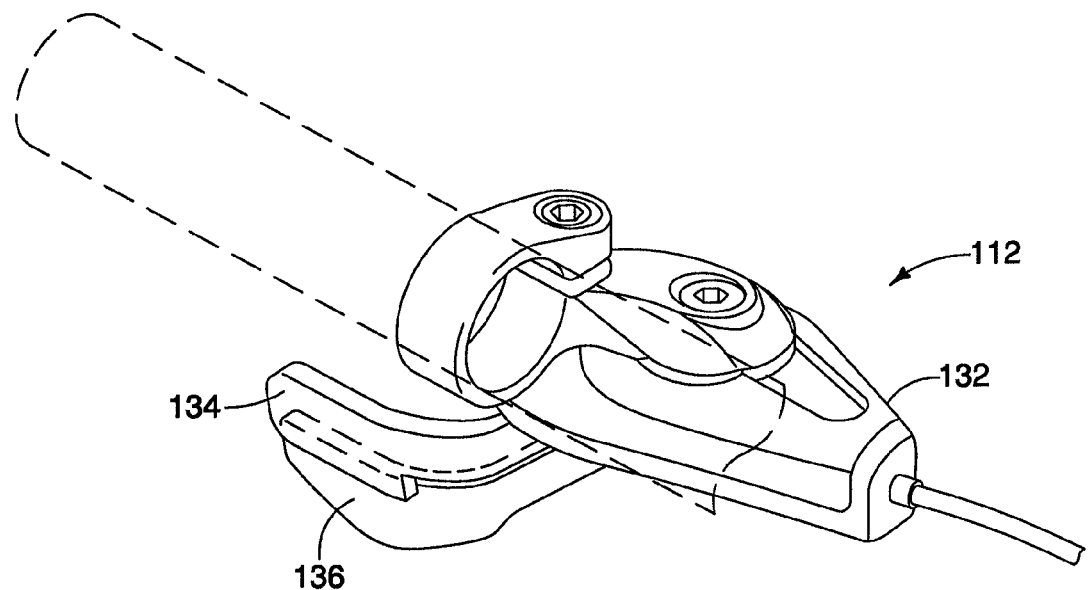
FIG. 26 is a perspective plan view of a bicycle control device coupled to a flat type handlebar in accordance with a second embodiment.
Figure 27:
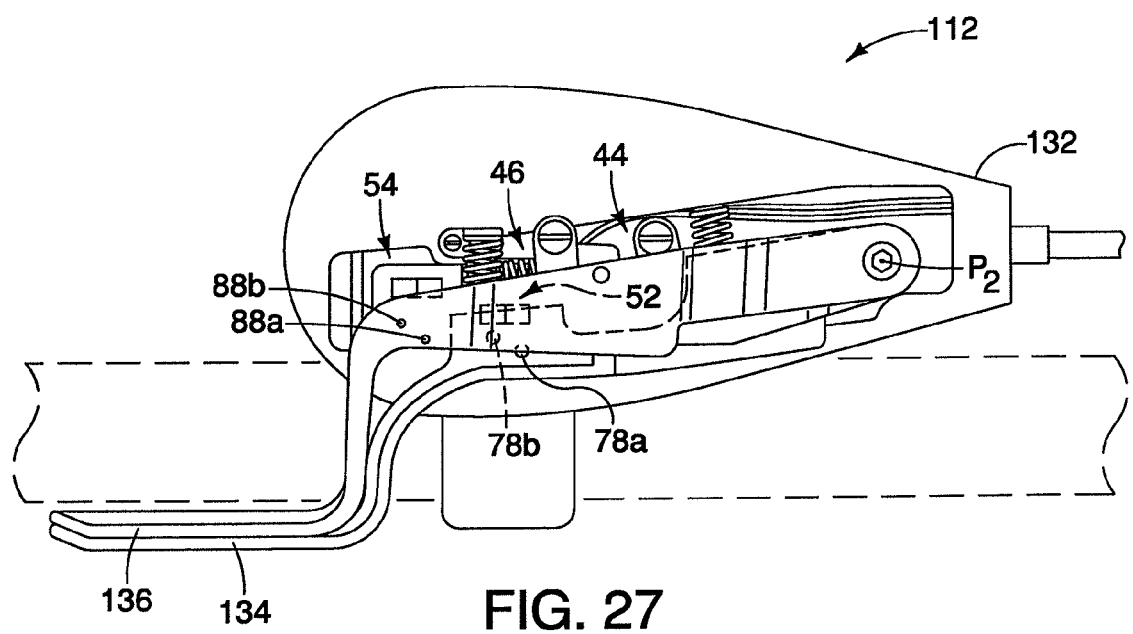
FIG. 27 is an enlarged, partial bottom plan view of selected parts of the bicycle in accordance with the second embodiment.

Referring now to FIGS. 26 and 27, a bicycle control device 112 is illustrated in accordance with a second embodiment. The bicycle control device 112 is a MTB type shifter. The basic structure is same as the bicycle control device (road shifter) 12, but the brake lever 32 is replaced by a mounting member for the bicycle control device (MTB shifter) 112. In other words, the bicycle control device 112 includes first and second operating members 134 and 136 that are pivotally attached to the back side of a housing 132. Each of the first and second operating members 134 and 136 can shift transmission by one or two steps (shift positions) depending on its stroke length (i.e., the amount of angular movement). The first and second operating members 134 and 136 are provided with the first and second clicking mechanisms 44 and 46, respectively, for haptically notifying the rider of the boundary between a one-step shift operation position and a two-step shift operation position for preventing unintentional two-step shift. Further, the first and second non-contact switches 52 and 54 are provided between the housing 132 and the first and second operating members 134 and 136 at locations to be actuated by pivotal movement of the first and second operating members 34 and 36, respectively. Thus, the bicycle control device 112 is essentially the same as the bicycle control device 12.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle control device mounted to a handlebar. Accordingly, these terms, as utilized to describe the present invention should be interpreted relative to a bicycle control device mounted to a handlebar as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A bicycle control device comprising:
a base member including a handlebar mounting structure;
a first operating member movably mounted with respect to the base member to move between a rest position, a first operation position and a second operation position that is past the first operation position during a single progressive stroke of the first operating member from the rest position to the second operation position;
a first non-contact switch operatively arranged with respect to the first operating member to detect movement of the first operating member with respect to the base member from the rest position to the first operation position, the first non-contact switch being further arranged with respect to the first operating member to detect movement of the first operating member with respect to the base member from the rest position to the second operation position; and
a first clicking mechanism operatively arranged with respect to the first operating member such that the first clicking mechanism produces a first haptic feedback response to indicate the first operating member being moved from the rest position to the first operation position.
2. The bicycle control device according to claim 1, wherein the first clicking mechanism is arranged with respect to the first operating member such that the first clicking mechanism produces a second haptic feedback response to indicate the first operating member being moved from the rest position past the first operation position to the second operation position.

3. The bicycle control device according to claim 1, further comprising
a brake lever pivotally mounted to the base member about a pivot axis, with the first operating member being pivotally mounted to a rear side of the brake lever.

4. The bicycle control device according to claim 1, further comprising
a second operating member movably mounted with respect to the base member to move between a rest position and at least a first operation position;
a second non-contact switch operatively arranged with respect to the second operating member to detect movement of the second operating member with respect to the base member from the rest position to the first operation position of the second operating member;
a second clicking mechanism operatively arranged with respect to the second operating member such that the second clicking mechanism produces a first haptic feedback response to indicate the second operating member being moved from the rest position of the second operating member to the first operation position of the second operating member.

5. The bicycle control device according to claim 4, wherein
the second operating member is further movably mounted with respect to the base member to move from the rest position of the second operating member to a second operation position that is past the first operation position of the second operating member during a single progressive stroke of the second operating member, and
the second non-contact switch is arranged with respect to the second operating member to detect movement of the second operating member with respect to the base member from the rest position of the second operating member to the second operation position of the second operating member.

6. The bicycle control device according to claim 5, wherein
the second clicking mechanism is arranged with respect to the second operating member such that the second clicking mechanism produces a second haptic feedback response to indicate the second operating member being moved from the rest position of the second operating member past the first operation position of the second operating member to the second operation position of the second operating member.

7. The bicycle control device according to claim 5, further comprising
a brake lever pivotally mounted to the base member about a brake lever pivot axis, with the first and second operating members being pivotally mounted to a rear side of the brake lever.

8. The bicycle control device according to claim 5, wherein
the first and second operating members are movably mounted with respect to the base member such that the first and second operating members move together when the first operating member is moved from the rest position of the first operating member to the first operation position of the first operating member and such that only the second operating member moves when the second operating member is moved from the rest position of the second operating member to the first operation position of the second operating member,
the first and second clicking mechanism are operatively arranged with respect to each other such that the first haptic feedback response of the first operating member occurs prior to the first haptic feedback response of the second operating member when the first and second operating members are moved together during operating movement of the first operating member from the rest position of the first operating member to the first operation position of the first operating member.

9. The bicycle control device according to claim 8, wherein
the first operating member is further movably mounted with respect to the base member to move from the rest position of the first operating member to a second operation position that is past the first operation position of the first operating member during a single progressive stroke of the first operating member,
the first non-contact switch is arranged with respect to the first operating member to detect movement of the first operating member with respect to the base member from the rest position of the first operating member to the second operation position of the first operating member.
the second operating member is further movably mounted with respect to the base member to move from the rest position of the second operating member to a second operation position that is past the first operation position of the second operating member during a single progressive stroke of the second operating member, and
the second non-contact switch is arranged with respect to the second operating member to detect movement of the second operating member with respect to the base member from the rest position of the second operating member to the second operation position of the second operating member.

10. The bicycle control device according to claim 9, wherein
the first clicking mechanism is arranged with respect to the first operating member such that the first clicking mechanism produces a second haptic feedback response to indicate the first operating member being moved from the rest position of the first operating member past the first operation position of the first operating member to the second operation position of the first operating member, and
the second clicking mechanism is arranged with respect to the second operating member such that the second clicking mechanism produces a second haptic feedback response to indicate the second operating member being moved from the rest position of the second operating member past the first operation position of the second operating member to the second operation position of the second operating member.

11. The bicycle control device according to claim 10, wherein
the first and second clicking mechanism are operatively arranged with respect to each other such that the second haptic feedback response of the first operating member occurs no later than the second haptic feedback response of the second operating member when the first and second operating members are moved together during operating movement of the first operating member from the rest position of the first operating member to the first operation position of the first operating member.

12. The bicycle control device according to claim 10, wherein
the first and second clicking mechanism are operatively arranged with respect to each other such that the second haptic feedback response of the first operating member occurs prior to the second haptic feedback response of the second operating member when the first and second operating members are moved together during operating movement of the first operating member from the rest position of the first operating member to the first operation position of the first operating member.

13. The bicycle control device according to claim 12, further comprising
a brake lever pivotally mounted to the base member about a brake lever pivot axis, with the first and second operating members being pivotally mounted to a rear side of the brake lever.

14. The bicycle control device according to claim 13, further comprising
a control unit electrically coupled to the first and second non-contact switches to receive operation signals from the first and second non-contact switches that are indicative of the first and second operating members being moved to one of the first and second operating positions.

15. The bicycle control device according to claim 14, wherein
the base member and the brake lever are configured as a drop down handlebar, road bicycle shifter.

* * * * *